(12) United States Patent
Diels

(10) Patent No.: US 8,820,364 B2
(45) Date of Patent: Sep. 2, 2014

(54) FLEXIBLE HOSE WITH SMOOTH INNER AND/OR OUTER WALL

(75) Inventor: Domin Diels, Gierle (BE)

(73) Assignee: Plastiflex Group, Paal-Beringen (BE)

( * ) Notice: Subject to any disclaimer, the term of this patent is extended or adjusted under 35 U.S.C. 154(b) by 257 days.

(21) Appl. No.: 13/146,810

(22) PCT Filed: Jan. 28, 2010

(86) PCT No.: PCT/IB2010/050394
§ 371 (c)(1),
(2), (4) Date: Oct. 14, 2011

(87) PCT Pub. No.: WO2010/086819
PCT Pub. Date: Aug. 5, 2010

(65) Prior Publication Data
US 2012/0018023 A1    Jan. 26, 2012

(30) Foreign Application Priority Data

| Jan. 28, 2009 | (BE) | ................................. 2009/0047 |
| May 19, 2009 | (BE) | ................................. 2009/0315 |
| Sep. 18, 2009 | (BE) | ................................. 2009/0577 |
| Sep. 18, 2009 | (CN) | ........................ 2009 1 0173470 |

(51) Int. Cl.
*F16L 11/11* (2006.01)

(52) U.S. Cl.
USPC ............ 138/121; 138/122; 138/129; 156/143

(58) Field of Classification Search
USPC ................. 138/121, 122, 129, 154, 173, 177; 156/143
See application file for complete search history.

(56) References Cited

U.S. PATENT DOCUMENTS

| 3,252,483 | A |   | 5/1966 | Swan |   |
| 4,471,813 | A |   | 9/1984 | Cothran |   |
| 4,862,924 | A | * | 9/1989 | Kanao | ............................ 138/144 |
| 5,007,462 | A | * | 4/1991 | Kanao | ............................ 138/154 |
| 5,191,916 | A | * | 3/1993 | Kanao | ............................ 138/173 |
| 5,390,704 | A |   | 2/1995 | Kanao |   |
| 5,443,100 | A | * | 8/1995 | Finley | ............................ 138/154 |
| 5,727,599 | A | * | 3/1998 | Fisher et al. | ................... 138/156 |

(Continued)

FOREIGN PATENT DOCUMENTS

| EP | 0 939 261 A1 | 9/1999 |
| EP | 1 407 707 A2 | 4/2004 |
| GB | 2 108 623 A | 5/1983 |
| WO | 2007/106737 A2 | 9/2007 |

OTHER PUBLICATIONS

International Search Report of PCT/IB2010/050394 dated Jun. 17, 2010.

*Primary Examiner* — Frederick C Nicolas
(74) *Attorney, Agent, or Firm* — Sughrue Mion, PLLC

(57) ABSTRACT

Flexible hose a corrugated wall of which an outer surface comprises a multitude of consecutive protrusions (1) and grooves (2) and of which an inner surface comprises a multitude of internal protrusions (4) and grooves (3), a multitude of barriers for closing off each of the multitude of internal and/or external grooves (2), each of the multitude of barriers comprising a first closing leg (10, 12) of a first profile part and a second closing leg (11, 13) of a second profile part, the second closing leg being directed to the first closing leg, the first and second closing legs having a complementary shape provided to form a substantially smooth inner and/or outer surface.

19 Claims, 9 Drawing Sheets

(56) References Cited

U.S. PATENT DOCUMENTS

| | | | |
|---|---|---|---|
| 5,769,127 A * | 6/1998 | Kanao et al. | 138/129 |
| 5,884,670 A * | 3/1999 | Akedo et al. | 138/119 |
| 5,975,143 A * | 11/1999 | Jarvenkyla et al. | 138/121 |
| 6,399,002 B1 * | 6/2002 | Lupke et al. | 264/139 |
| 6,644,357 B2 * | 11/2003 | Goddard | 138/121 |
| 6,840,285 B2 * | 1/2005 | Toliver et al. | 138/121 |
| 7,063,108 B2 * | 6/2006 | Toliver et al. | 138/121 |
| 7,156,128 B1 * | 1/2007 | Kanao | 138/133 |

* cited by examiner

FLEXIBLE HOSE WITH SMOOTH INNER AND/OR OUTER WALL

CROSS REFERENCE TO RELATED APPLICATIONS

This application is a National Stage of International Application No. PCT/IB2010/050394 filed Jan. 28, 2010, claiming priority based on Belgium Patent Application Nos. 2009/0047 filed Jan. 28, 2009, 2009/0315 filed May 19, 2009 and 2009/0577 filed Sep. 18, 2009 and Swiss Patent Application No. 200910173470.7 filed Sep. 18, 2009, the contents of all of which are incorporated herein by reference in their entirety.

BACKGROUND OF THE INVENTION

1. Field of the Invention

The present invention relates to a flexible hose as described in the preamble of the first claim. This invention further relates to a profile for the production of this hose and a method for the production of this hose.

2. Background

A flexible hose with a corrugated inner and outer wall is for example used in vacuum cleaning systems and drainage systems.

In vacuum cleaning systems in which air, possibly in combination with dust particles, is transported through the hose, a part of the air and/or the dust particles will collapse with the multitude of internal grooves, present on the inner surface of the wall of the hose beneath the multitude of external protrusions of the outer surface. This increases the flow resistance for the air and/or dust particles, which results in a decrease of the maximum potential that is available at the suction mouth for sucking up the dust. Moreover, the presence of the internal grooves can, for a specific shape and number, also lead to a whistling of the hose. In drainage systems, the corrugated inner surface has the disadvantage that dirt can accumulate between the grooves, which can cause undesirable clogging and odor formation.

EP-A-1969987 describes a flexible vacuum cleaning hose in which the occurring whistling of the hose is reduced. Thereto a shielding is provided on the inner surface of the wall for closing each of the internal grooves. This shielding is for example formed by a first closing leg of a first profile and a second closing leg of an adjacent profile, the second closing leg being directed to the first closing leg. The first and second closing legs are bent towards the inside of the hose and overlap at least partially with each other. Hereby, the access of air and/or dust particles to the internal grooves is blocked and the undesirable whistling is reduced. However, because the first and second leg overlap at least partially with each other, an uneven surface is formed, as a result of which the flowing resistance for the air and/or dust particles, inside of the hose is increased and the dust can accumulate in the hose. This is undesirable.

JP-A-11159668 describes a flexible hose comprising a corrugated wall that comprises a multitude of internal and external grooves and protrusions. The flexible hose is formed by spirally winding of an S-shaped profile. In a specific embodiment of the flexible hose, each of the internal grooves is formed by a first S-shaped profile part closed by a closing leg of an adjacent second S-shaped profile part for the formation of a smooth inner surface. The closing leg extends from an upright leg of the first S-shaped profile part over the entire length of the internal groove up to and underneath the laying leg of the internal protrusion. The length of the closing leg is in other words substantially equal to the length of the S-shaped profile part. The closing leg thereby substantially increases the weight of the hose. Moreover, while bending the hose in an inward direction, the increased length of the closing leg will result in a reduction of the inner diameter of the hose, an uneven inner surface of the outer curve of the hose and an increase in the air resistance throughout the hose.

The corrugated outer surface of a flexible hose can also lead to an undesirable accumulation of dirt between the consecutive external grooves. The corrugated outer surface also has the disadvantage that the hose easily gets stuck behind objects which creates difficulties in using the hose. This is especially so in the case of vacuum cleaning hoses in central vacuum systems. Therefore, to make the outer surface more smooth, often some sort of stocking is pulled over the hose, which has a disadvantageous effect on the weight and the cost-price of the hose.

SUMMARY OF THE INVENTION

The goal of the present invention is therefore to develop an alternative flexible hose that solves one or more of the aforementioned problems.

This is achieved with a flexible hose showing the technical features of the characterizing part of the first claim.

The flexible hose according to the present invention is thereto characterized in that the corrugated wall comprises a multitude of barriers for closing off each of the multitude of internal and/or external grooves, each of the multitude of barriers comprising a first closing leg of a first profile part and a second closing leg of a second adjacent profile part, the second closing leg being directed to the first closing leg, the first and the second closing legs partially overlapping each other in longitudinal direction of the hose and have a complementary shape provided to form a substantially smooth inner and/or outer surface.

The multitude of internal and external grooves/protrusions gives a certain flexibility to the hose. This makes the hose usable in applications in which a large degree of flexibility of the hose is required, such as for example vacuum cleaning or drainage systems, aeration and ventilation systems and channels in buildings, systems for cleaning swimming pools, medical systems such as artificial respiration systems, etc.

The multitude of barriers provided on the inner and/or outer surface of the hose are provided for closing off each of the multitude of internal and/or external grooves of the hose.

Barriers provided on the inner surface of the flexible hose decrease the risk that dirt, associated with the medium that is transported through the hose, is accumulated between the internal grooves of the flexible hose. As a result of this, the flexible hose according to the present invention also has the advantage that the risk of undesirable clogging or odor formation is decreased.

Barriers provided on the outer surface of the flexible hose decrease the risk that dirt from outside of the hose, for example when the hose slides over the floor during use, is accumulated between the external grooves of the flexible hose.

Each of the multitude of barriers provided to close each of the multitude of internal and/or external grooves comprises a first closing leg of a first profile part and a second closing leg of a second profile part, the second closing leg being directed to the first closing leg. The first and second closing leg have a complementary shape and provide the flexible hose with a substantially smooth inner- and/or outer surface.

The complementary shape of the first and second closing leg for closing an internal groove provide the flexible hose with a substantially smooth inner surface and therefore provide a minimal flow resistance/air resistance inside of the hose. A lower flow resistance is beneficial given the fact that this can result in a lower power consumption while using the hose in for example a vacuum cleaner. A standard hose of this type usually has an inner diameter of 33 mm and a length of 1.8 meter. For this type of standard hose, a minimal flow resistance means a pressure loss over the hose that is preferably lower than 12 mbar, more preferably lower than 10 mbar.

Because the first and second closing legs for the closing of an internal groove, provide the flexible hose with a substantially smooth inner surface, the flexible hose according to the present invention has the additional advantage that the whistling of the hose while transporting a medium, such as air, is reduced.

The substantially smooth inner surface has the advantage that also the flow resistance is reduced, as a result of which the diameter of the hose can be reduced. A smaller diameter results in lighter and cheaper hoses. Because the inner wall is smooth, less flow losses occur, as a result of which a larger flow rate can be pumped through the hose which is beneficial for pumping times in for example drainage hoses.

The use of two closing legs with a complementary shape directed to each other, has as an advantage compared to the use of one closing leg that the weight of the hose can be reduced. Because with two closing legs, the legs can be made shorter, the closing legs can made thinner without adversely influencing the strength of the hose, which can lead to a reduction of the weight of the hose. Making the two closing legs thinner compared to the use of one single closing leg additionally results in an increased flexibility of the hose.

A substantially smooth outer surface provides a minimal resistance upon manipulation of the hose and further decrease the risk that dirt is accumulated between the external grooves. Moreover, the substantially smooth outer surface decreases the risk that the hose gets stuck behind objects during use of the hose.

The corrugated wall of the hose is usually formed by spirally winding of consecutive profiles formed by a number of upright (straight/sloping) legs and laying legs. With upright is meant extending in an angle of at least 60.degree. compared to the radial direction of the hose. With laying is meant extending substantially in radial direction of the hose. The length of the laying legs of the profile substantially determines the width of the internal and external grooves, while the length of the upright legs of the profile substantially determines the height of the internal and external grooves.

Preferably the first and second closing legs of a profile are situated at opposite ends of a laying leg of the profile and extends in the prolonged area of the laying leg in opposite directions of each other.

The complementary shape and the overlap of the first and second leg of the inner and/or outer surface are preferably chosen such that the internal and/or external grooves are substantially closed on every moment and the inner- and/or outer wall remains substantially smooth, independent of the inward or outward bending of the hose. Preferably the cooperating parts of the first and the second closing leg therefore have complementary shapes that can slide along each other upon inward or outward bending of the hose, such as for example a wedge shape or an oval shape. The cooperating complementary shapes of the first and the second closing leg of the inner and/or outer surface of a non-bent hose are preferably situated in the same plane so that the internal and/or external groove is closed and at the same time a substantially smooth inner and/or outer surface is provided. The complementary shape of the closing legs further has the advantage that the closing legs can slide along each other during manipulation of the hose, as a result of which the flexibility is not adversely affected. The pitch of the flexible hoses, i.e. the distance between consecutive internal and/or external grooves, according to the present invention is preferably at least 5 mm. The advantage of such a hose is that, by increasing the pitch, surprisingly the weight of the hose can be reduced. Moreover, an increase of the pitch can lead to a reduction of the number of internal and/or external grooves, as a result of which the air resistance can be decreased.

The increasing of the pitch can be combined with a widening of the internal and/or external groove. Optionally the width of the internal and/or external groove can be increased at a constant pitch.

A wider internal and/or external groove results in a more flexible hose with a smaller bend radius and a higher hub strength. The hub strength is a measure for the force that is needed to press the hose until it is flat. The bend radius is the minimal radius by which you can bend the hose inwardly without the hose being damaged. An increase of the flexibility is more specifically useful if the hoses have to be installed in smaller spaces, for example ventilation hoses in buildings. Preferably, the width of the internal and/or external grooves is at least 0.5 mm, more preferably at least 1 mm. Moreover a widening of the internal groove results in an increase of the flexibility of the hose without adversely influencing the air resistance inside of the hose.

A wider internal and/or external groove results in a reduction of the weight of the hose.

Changing the distance between consecutive external protrusions and/or grooves, i.e. changing the pitch of the hose and/or changing the width of the internal and/or external grooves can moreover occur independently of the closing legs. If the closing legs are for example provided to close an internal groove, the distance between consecutive internal grooves can be increased without having to extend the closing legs.

A widening of the internal and/or external groove can moreover result in a reduction of the weight of the hose.

This widening can for example be useful in the production process of the hose. Consecutive profile parts are preferably wound as such that adjacent upright legs of consecutive parts of the profile are vertically connected to each other.

Instead of vertically connecting/gluing consecutive profile parts to each other, i.e. through upright profile parts, the connection can also be applied horizontally through an additional laying leg provided on one of the vertical legs of the profile. The connection between consecutive profile parts can then be applied by horizontally connecting the additional laying leg of the first profile with the second laying leg of a consecutive profile or by connecting the adjacent upright legs of consecutive profile parts of the S-shaped profile part or by a combination of both.

If the profile is provided with an additional laying leg, preferably one of the upright legs is removed. Because the additional laying leg is shorter than the removed upright leg, this can result in a further reduction of the weight of the hose.

The horizontal connection is preferably applied on flexible hoses with a pitch of more than 5 mm, but can also be applied on flexible hoses with a smaller pitch.

Preferably the height of the consecutive grooves/protrusions is increased by increasing the profile out of which the flexible hose is built. The height of the grooves/protrusions is preferably between 4-6 mm.

Increasing the height of the profile results in a more than linear increase of the hub strength of the hose.

An increase of the pitch of the hose is preferably combined with an increase of the height of the profile. Because increasing the pitch means a higher weight loss that the increase in weight by increasing the profile height, the combination of increasing the pitch with an increase of the profile height will cause a weight loss of the hose and a hose with a higher hub strength. Moreover a higher profile increases the flexibility of the hose.

Optionally electrical wires can also be formed in the profile. This can more specifically be useful in vacuum cleaning hoses for the electrical connecting of a suction unit with the suction head or in ventilation hoses for heating the air stream inside of the hose. The profile can have a single or a multiple pitch, that can optionally be provided in different colors for example for the incorporation of different types of electrical wires. A singe profile can optionally be multiply wound to produce a hose with 2, 3 or multiple pitch.

Optionally an additional auxiliary hose, that for example contains an electrical wire or a pull relief or is provided for transport of a second fluid, can be connected to at least one side of the inner surface of the hose. The auxiliary hose can for example extend in longitudinal direction of the hose on one side of the inner surface of the hose or spiral-shaped on the inner surface of the hose. Providing such an auxiliary hose on at least one side of the inner surface of the hose fixates to a certain level the closing legs of the hose provided on that side of the inner surface and therefore reduces the flexibility of the hose. Therefore, preferably the width of the internal and/or external grooves is increased in case an additional auxiliary hose is provided inside of the hose. Given that the widening of the internal and/or external grooves increases the flexibility of the hose, the combination of a hose with an auxiliary hose and a widening of the internal and/or external grooves can surprisingly lead to an increase of the flexibility of the hose, a reduction of the weight of the hose and a smaller bend radius of the hose compared to a hose without widening. Preferably the width of the internal and/or external grooves is at least 0.5 mm, preferably at least 1 mm.

The flexible hose can be produced by spirally winding of one, two or more profiles at once, wherein the different profiles can be the same or different. If for example the hose is produced by simultaneously winding two identical profiles, the winding pitch of the hose is doubled, while the pitch, i.e. the distance between consecutive internal grooves and/or protrusions remains the same. An increase of the winding pitch can moreover result in a reduction of the air resistance of the hose.

Optionally the flexible hose can be produced by spirally winding of a multiple profile, wherein in every winding two or more internal grooves and/or protrusions are formed, that can be connected to each other by one or more welding spots.

A flexible hose according to the present invention with a substantially smooth inner- and/or outer surface is more specifically useful for several applications, such as, but not restricted thereto, a drainage hose in washing machines, a hose for use in medical applications such as a hose for artificial respiration- or ventilation systems, a hose for ventilation systems in buildings, a hose for use in central vacuum systems.

In another aspect of the invention, possibly in combination with other features mentioned herein, a method is presented for the production of a synthetic hose with a non-circular section. This method generally comprises the steps of: the production of a synthetic hose with a circular section, the heating of the hose to a temperature at which the synthetic material is deformable without the synthetic material melting, the deformation of the hose by compression in a mould between complementary mould parts so that the hose takes on a deformed shape and the cooling of the hose so that the hose keeps the deformed shape after removal out of the mould.

As such, starting from a hose with a circular section, such as for example the herein described synthetic hose produced by spirally winding of a profile, a hose can be produced with an oval, rectangular, triangular, or other non-circular section.

The heating of the hose can occur before and/or during the compression in the mould, depending of the desired final shape. The cooling of the hose occurs before the mould is opened.

The heating of the hose can for example be realized by blowing a heated gas, for example air, through the hose, or by heating the mould parts, or by carrying out the compression in a heated room, or by any other way considered suitable by the person skilled in the art.

BRIEF DESCRIPTION OF THE DRAWINGS

The invention is further illustrated below based on the enclosed FIGS. 1-11.

DETAILED DESCRIPTION OF THE INVENTION

Figure 1:
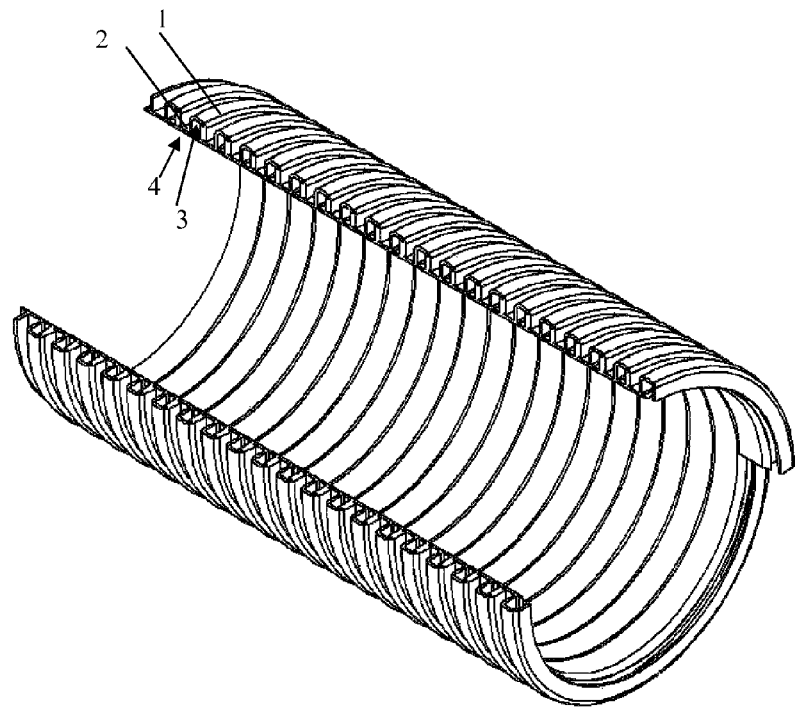
FIG. 1 presents an embodiment of a flexible hose with a substantially smooth inner wall according to the invention.

The flexible hose presented in FIGS. 1-11 comprises a corrugated wall of which the outer surface comprises a multitude of consecutive external protrusions 1 and external grooves 2.

The external protrusions 1 provided on the outer surface of the hose form a multitude of internal grooves 3 on the inner surface of the wall. These internal grooves 3 are closed from the stream inside of the hose by two closing legs 10, 11 of consecutive profile parts which are directed to each other that have a complementary cooperative shape and provide the flexible hose with a substantially smooth inner surface.

The cooperative parts of the first 10 and second 11 internal closing leg can have any complementary shape considered suitable by the person skilled in the art. In FIGS. 2, 4, 5, 6, 10 and 11 the closing legs 10, 11 directed to each other have an overlapping wedge shape. In FIGS. 7, 8 and 9 the internal closing legs 10, 11 have an overlapping oval shape.

Figure 11A:
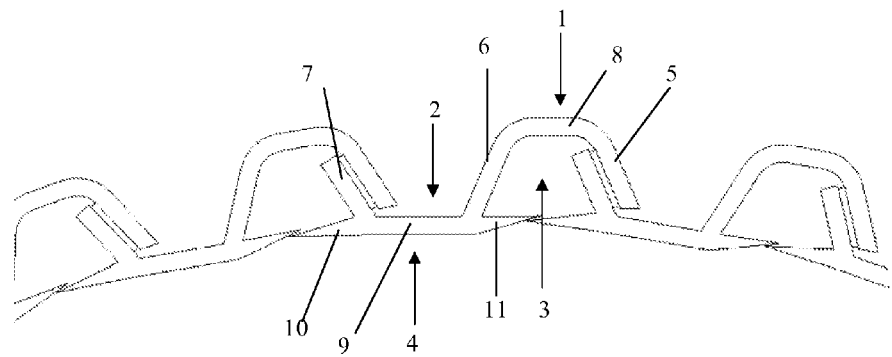
FIGS. 11A and 11B are detail drawings of respectively the outer and inner part of the inward bent flexible hose presented in FIG. 10.
Figure 11B:
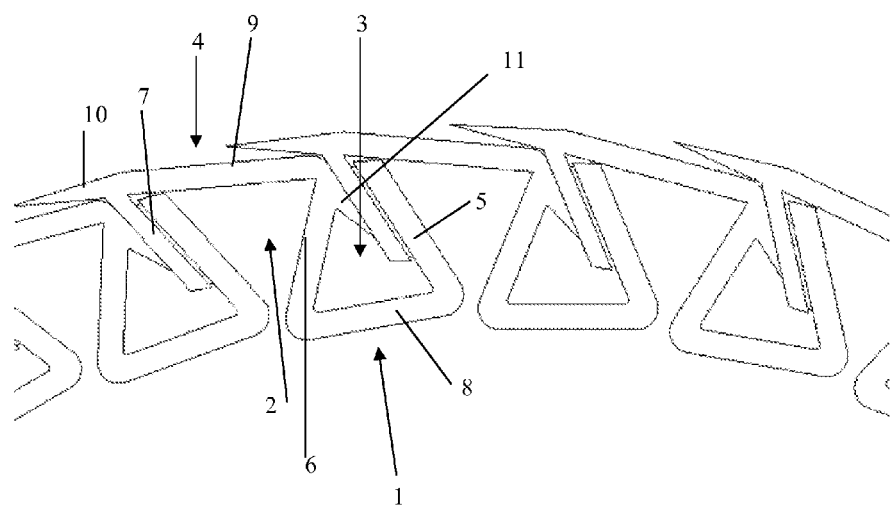

The shape of both internal closing legs 10, 11 is preferably so that during a normal bending of the hose, such as this occurs during use, both during outward bending as well as during inward bending of the hose, the internal grooves 3 remain substantially closed from the internal stream. Moreover the shape of both closing legs 10, 11 is preferably so that the inner surface remains substantially smooth, independent of the outward or inward bending of the hose. This is illustrated in FIGS. 8-11, that present the flexible hose in an inward bent position. The closing legs 10 and 11 slide along each other as a result of which the internal groove 3 remains closed from the internal stream inside of the hose. The outer part of the hose presented in FIGS. 9A and 11A is less deformed by the inward bending of the hose than the inner part presented in FIGS. 9B and 11B. In fact, while bending the hose, the profile is pressed in the inner bend of the hose and pulled open in the outer bend of the hose. Moreover in FIGS. 8-11 is illustrated that because of the complementary shape of the closing legs 10 and 11, the inner surface remains substantially smooth in the inward bent position of the hose.

Figure 5:
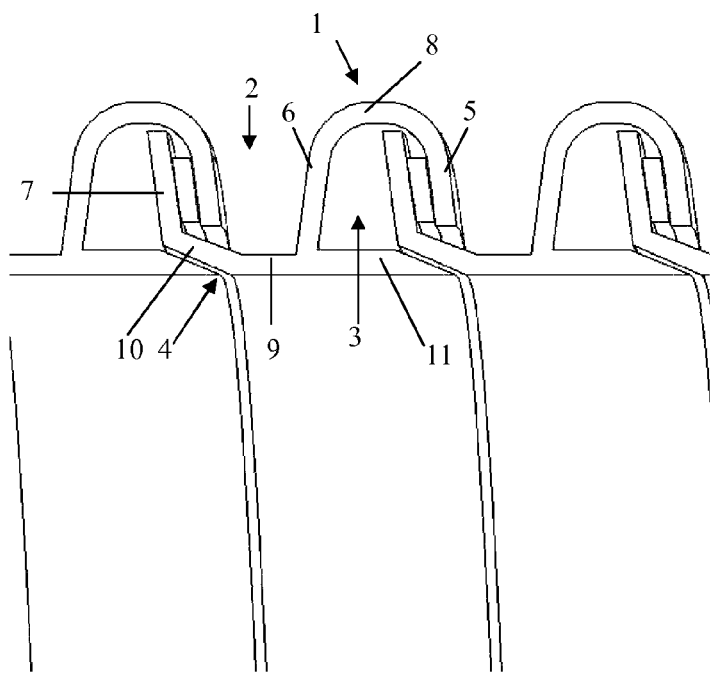
FIG. 5 presents another embodiment of a flexible hose with a substantially smooth inner wall according to the invention.
Figure 6:
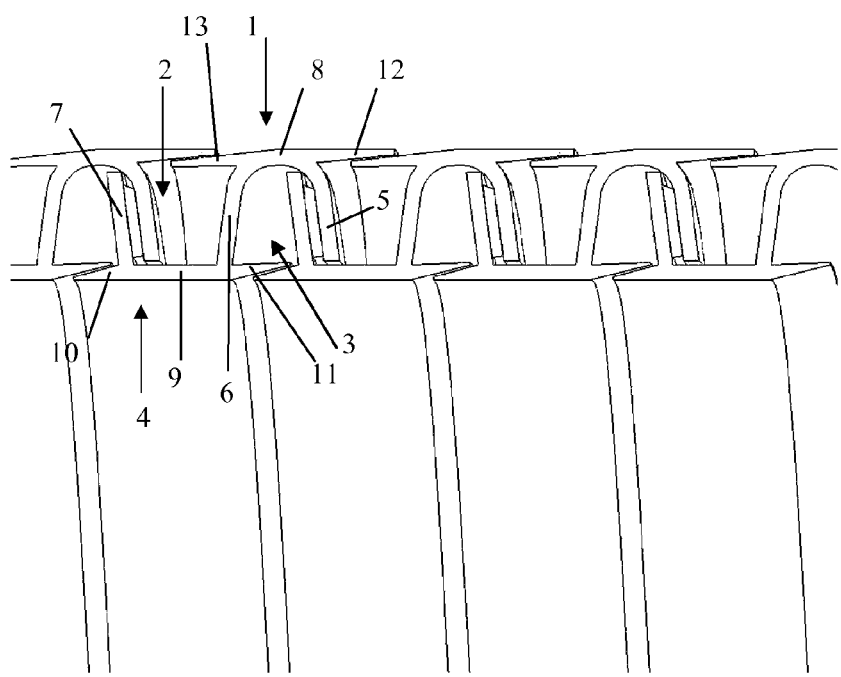
FIG. 6 presents an embodiment of a flexible hose with a substantially smooth inner- and outer wall according to the invention.
Figure 7:
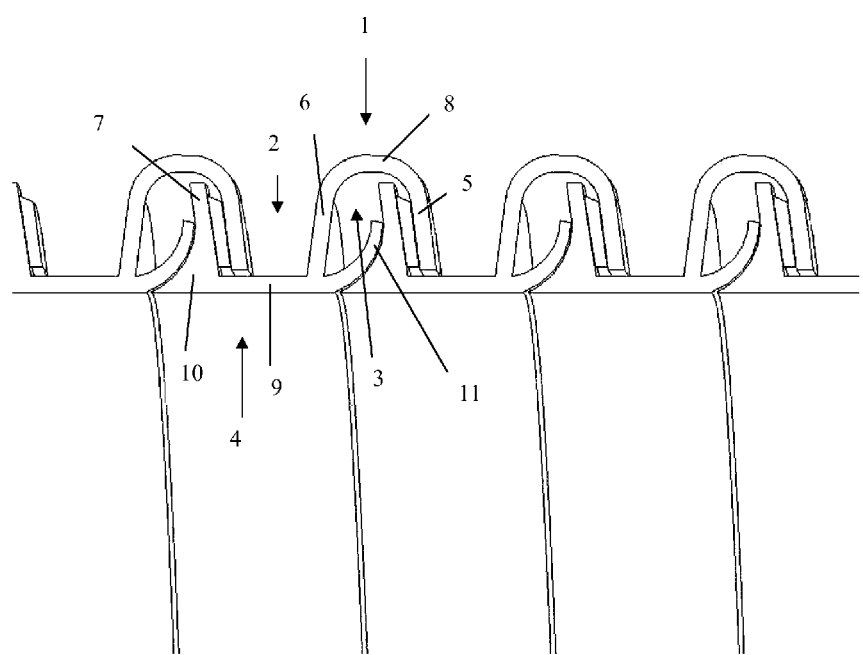
FIG. 7 presents another embodiment of a flexible hose with a substantially smooth inner wall according to the invention.
Figure 8:
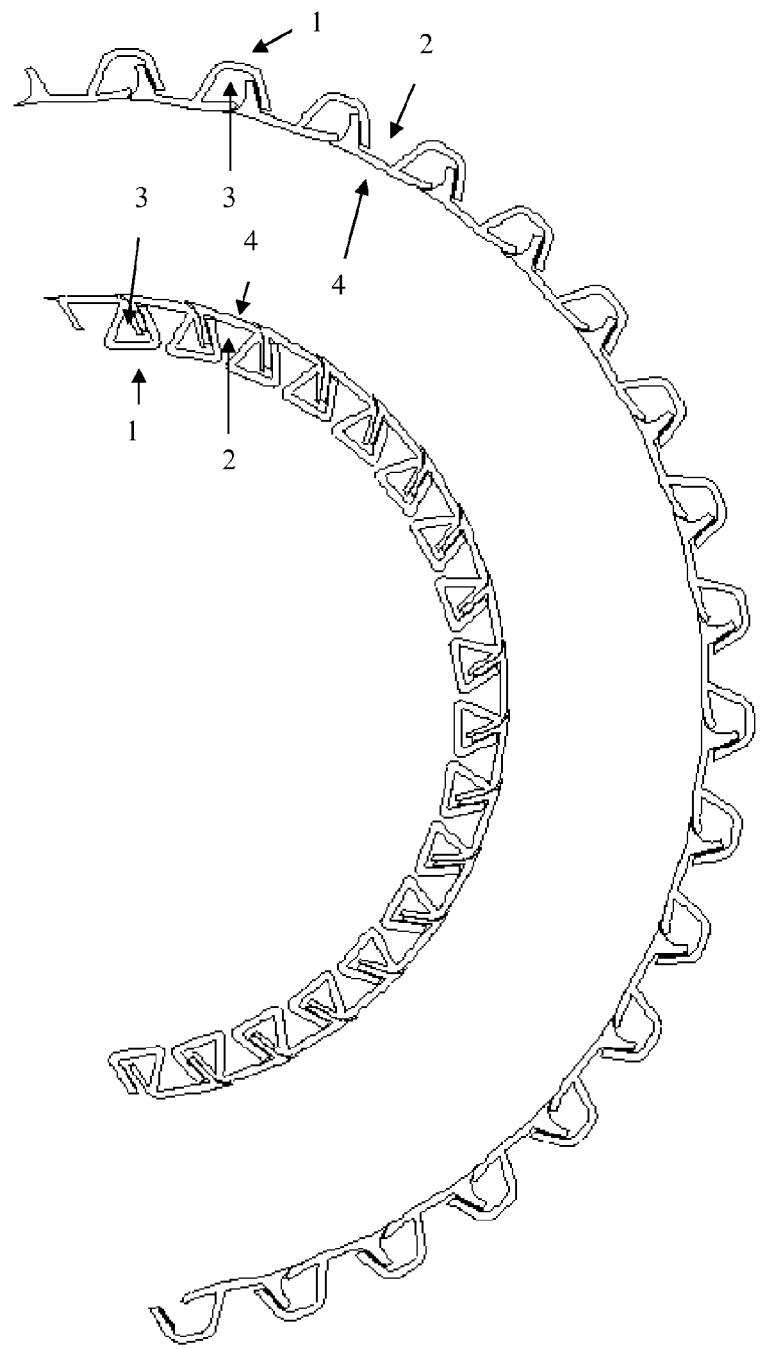
FIG. 8 presents another embodiment of a flexible hose with a substantially smooth inner wall according to the invention in an inward bent position.
Figure 9A:
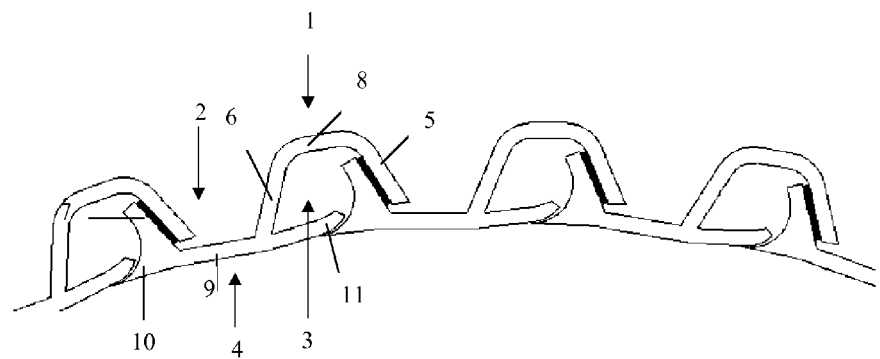
FIGS. 9A and 9B are detail drawings of respectively the outer and inner part of the inward bent flexible hose presented on FIG. 8.
Figure 9B:
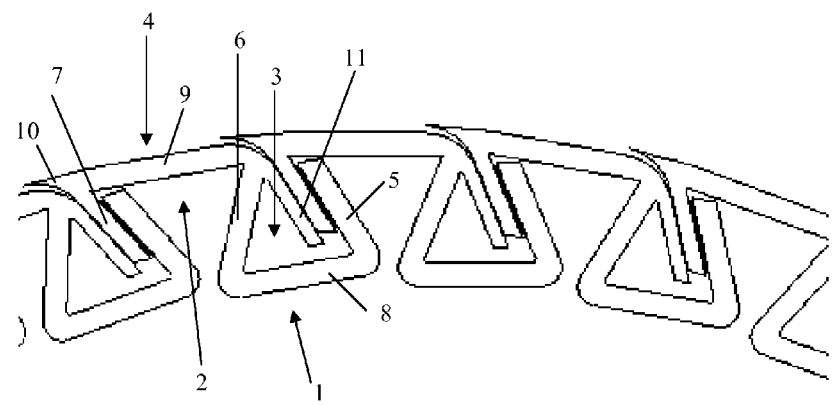
Figure 10:
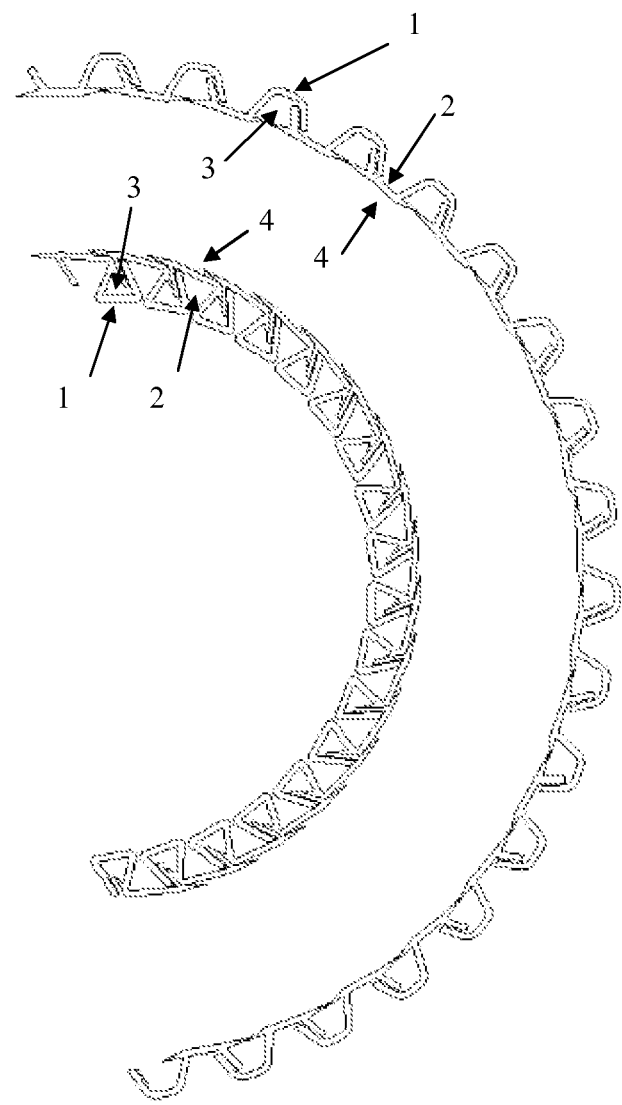
FIG. 10 presents another embodiment of a flexible hose with a substantially smooth inner wall according to the invention in an inward bent position.

The flexible hose presented in FIGS. 1-11 comprises a corrugated outer surface that comprises a multitude of consecutive external protrusions 1 and grooves 2. In FIG. 6, the external grooves 2 are closed off from the environment outside of the hose by two to external closing legs 12, 13 of consecutive profile parts, the legs being directed to each other and having a complementary cooperative shape which provides the flexible hose with a substantially smooth outer surface.

Figure 2:
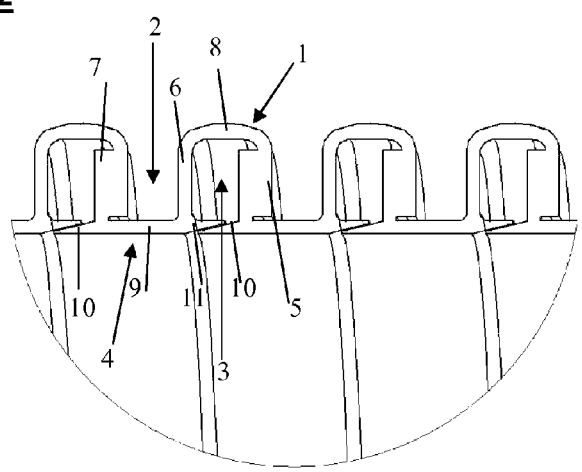
FIG. 2 presents a detail of a connection of consecutive profiles for the production of the flexible hose shown in FIG. 1.
Figure 3:
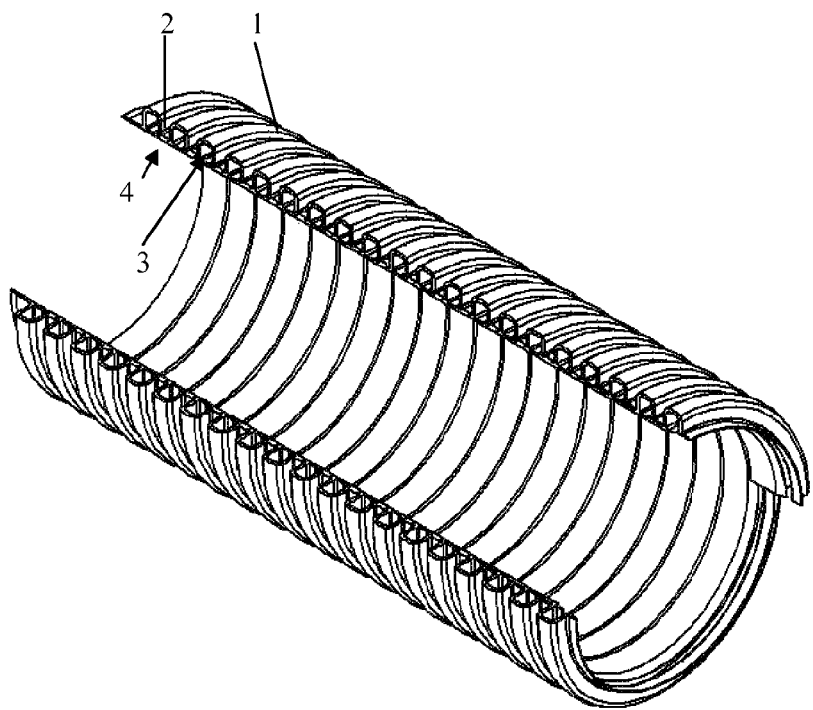
FIG. 3 presents another embodiment of a flexible hose with a substantially smooth inner wall according to the invention.
Figure 4:
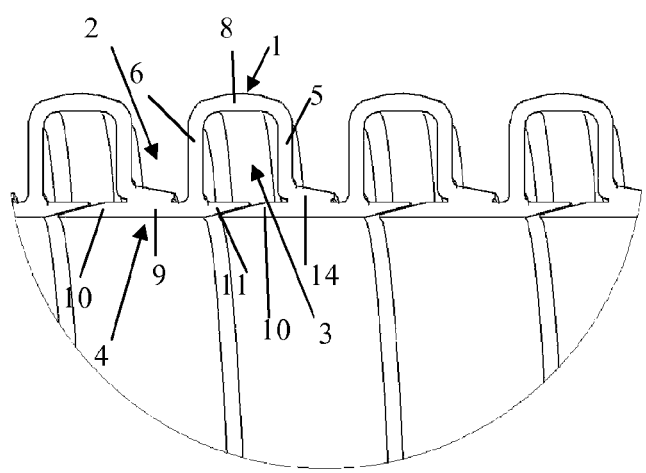
FIG. 4 presents a detail of a connection of consecutive profiles for the production of the flexible hose shown in FIG. 3.

The cooperative parts of the first 12 and second 13 external closing leg can have any shape considered suitable by the person skilled in the art. More specifically the cooperative parts of the first 12 and second 13 external closing leg can have the same or a different shape from the first 10 and second 11 internal closing leg. In FIG. 2 the external closing legs 12, 13 have an overlapping wedge shape. The shape of both external closing legs 12, 13 is preferably so that both during the outward bending as during the inward bending of the hose, the external grooves 2 stay closed from the environment outside of the hose. Moreover the shape of both closing legs is preferably so that the outer surface stays substantially smooth, independent of the outward or inward bending of the hose.

The multitude of barriers can be provided only on the outer surface of the hose, only on the inner surface of the hose, or both on the outer- and on the inner surfaces of the hose.

The flexible hose according to the invention is preferably formed by the spiral winding and connecting to each other of consecutive profile parts. FIGS. 1-2 and FIGS. 5-11 present a flexible hose according to the invention, wherein the connection between consecutive profile parts occurs through two adjacent upright legs 5, 7 of consecutive profiles.

To realize this connection, the profile presented in FIGS. 1-2 and FIGS. 6-11 has an S-shape, with a first 5 and a second 6 upright leg separated by a first laying leg 8 for the formation of an external protrusion 1 of the hose, and a third upright leg 7 and a second 9 adjacent laying leg that together with the second upright leg 6 form an external groove 2 of the hose. In FIG. 5 the external groove is formed by the second 6 and third 7 upright leg, the second laying leg 9 and the first internal closing leg 10. Consecutive profile parts are connected to each other by connecting the third upright leg 7 of a first profile with the first upright leg 5 of a consecutive profile. The first 10 and second 11 internal closing leg extend from opposite ends of the second laying leg 9 in opposite directions. The length and shape of the first 10 and second 11 internal closing leg is so that their ends cooperate and close the internal groove 3 and provide the flexible hose with a substantially smooth inner surface, independent of the inward or outward bending of the hose.

The profile presented in FIG. 6 has an S-shape, with a first 5 and a second 6 upright leg separated by a first laying leg 8 for the formation of an external protrusion 1 of the hose, and a third upright leg 7 and second laying leg 9 that together with the second upright leg 6 form an external groove 2 of the hose. Consecutive profile parts are connected to each other by connecting the third upright leg 7 of a first profile with the first upright leg 5 of a consecutive profile. The first 10 and second 11 internal closing leg extend from opposite ends of the second laying leg 9 in opposite directions in the prolonged area thereof. The length and shape of the first 10 and second 11 internal closing leg is so that their ends cooperate and close the internal groove 3 and provide the flexible hose with a substantially smooth inner surface, independent of the inner or outer bending of the hose. The first 12 and second 13 external closing leg presented in FIG. 6 extend from opposite ends of the first laying leg 8 in opposite directions. The length and shape of the first 12 and second 13 external closing leg is so that their ends cooperate and close the external groove 2 and provide the flexible hose with a substantially smooth outer surface, independent of the outward or inward bending of the hose.

Optionally the connection between consecutive profile parts can also occur horizontally instead of vertically, i.e. through adjacent laying legs. This is for example presented in FIGS. 3 and 4, wherein the profile comprises an additional laying leg 14 that is connected with the second laying leg 9 of a consecutive profile.

If the connection occurs horizontally, an S-shaped profile can be used as is presented in FIG. 2 with an additional laying leg 14. Preferably the profile then does not comprise a third upright leg as is presented in FIGS. 3 and 4. The replacement of the third upright leg 7 of the profile by a shorter additional laying leg 14, results in a decrease of the weight of the hose and a cost saving because less material is used for the production of the hose.

Figure 12A:
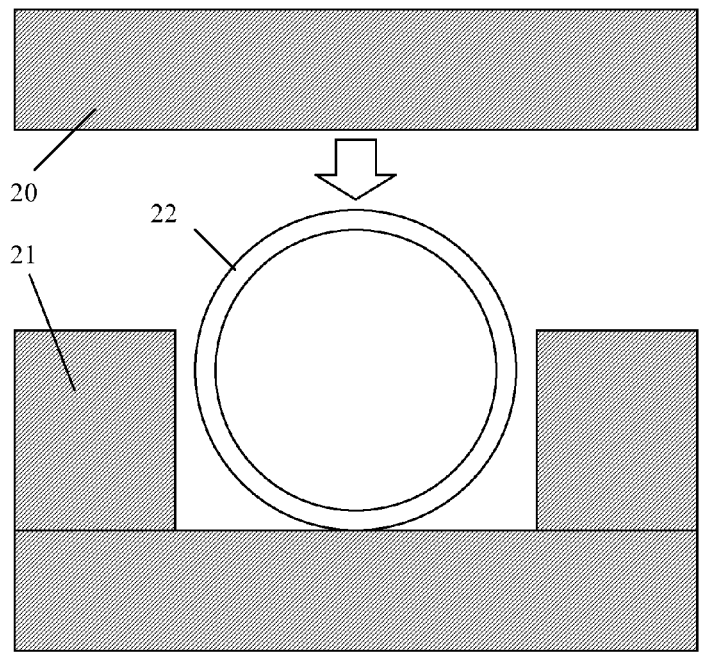
FIGS. 12A and 12B present a method according to another aspect of the invention for the production of a hose with a non-circular section.
Figure 12B:
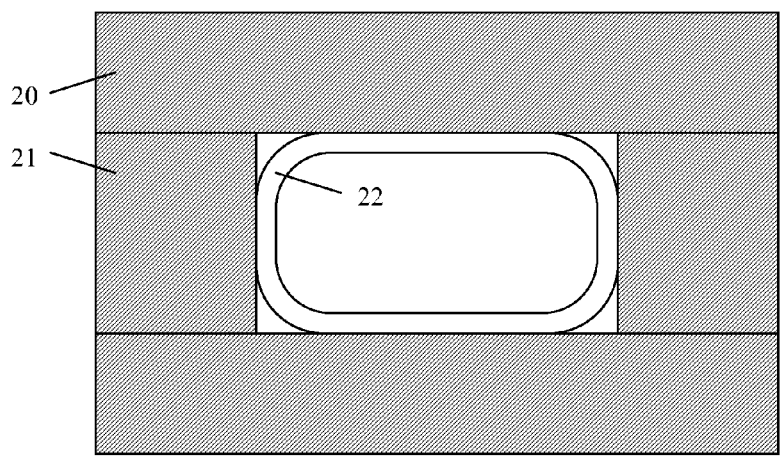

As is presented in FIG. 12A-B starting from a hose 22 with a circular section, such as the herein described synthetic hose produced by spirally winding of the profile with closing legs, a hose can be produced with for example an oval or rectangular section, which is often applied in ventilation canals. Thereto the hose 22 is heated to a temperature at which the synthetic material becomes plastically deformable without the synthetic material melting (a temperature between the glass transition temperature and the melting temperature of the synthetic material) and the hose is deformed by compression in a mould between complementary mould parts 20, 21. As a result of this, the hose takes on the deformed shape. By cooling the hose 22 in the mould 20, 21, the hose 22 keeps the deformed shape after removal out of the mould.

Instead of an oval or rectangular section, also a triangular, or other non-circular section can be obtained with a method according to FIG. 12.

The heating of the hose 22 can occur before and/or during the compression in the mould. The heating of the hose can for example be accomplished by blowing a heated gas, for example air through the hose, or by heating the mould parts, or by carrying out the compression in a heated room, or in another way considered suitable by the person skilled in the art.

The cooling of the hose 22 occurs before the mould is opened, for example by blowing a cool air stream through the hose or by cooling the mould parts 20, 21.

The invention claimed is:

1. A flexible hose comprising a corrugated wall of which an outer surface comprises a multitude of consecutive protrusions (1) and grooves (2) and of which an inner surface comprises a multitude of internal protrusions (4) and grooves (3), wherein each internal protrusion (4) and groove (3) is respectively situated beneath a corresponding external groove (2) and protrusion (1) of the outer surface, characterized in that the corrugated wall comprises a multitude of barriers for closing off each of the multitude of internal (3) and/or external (2) grooves, each of the multitude of barriers comprising a first closing leg (10, 12) of a first profile part and a second closing leg (11, 13) of a second adjacent profile part, the second closing leg (11,13) being directed to the first closing leg (10, 12), the first (10, 12) and second (11, 13) closing legs partially overlapping each other in longitudinal direction of the hose and having complementary shapes provided to slide along each other upon inward or outward bending of the hose and to form a substantially smooth inner and/or outer surface.

2. A flexible hose according to claim 1, characterized in that at least one of the multitude of first (10, 12) and second closing legs (11, 13) is situated at opposite ends of a laying leg of at least one of the multitude of internal (3) and/or external (2) grooves and extends in the prolonged area of the laying leg in opposite directions of each other.

3. A flexible hose according to claim 1, characterized in that at least one of the first (10, 12) and second (11, 13) closing legs have overlapping wedge shapes for closing each of the multitude of internal (3) and/or external (2) grooves.

4. A flexible hose according to claim 1, characterized in that at least one of the first (10, 12) and second (11, 13) closing legs have overlapping oval shapes for closing each of the multitude of internal (3) and/or external (2) grooves.

5. A flexible hose according to claim 1, characterized in that at least one of the first (10, 12) and second (11, 13) closing legs extend in substantially the same plane.

6. A flexible hose according to claim 1, characterized in that the consecutive at least one of the internal and/or external protrusions (1,4)/grooves (2,3) of the outer surface of the corrugated wall are spaced apart at a distance of 5 mm or more from each other.

7. A profile provided to produce a flexible hose comprising a corrugated wall of which an outer surface comprises a multitude of consecutive protrusions (1) and grooves (2) and of which an inner surface comprises a multitude of internal protrusions (4) and grooves (3), wherein each internal protrusion (4) and groove (3) is respectively situated beneath a corresponding external groove (2) and protrusion (1) of the outer surface, wherein the corrugated wall comprises a multitude of barriers for closing off each of the multitude of internal (3) and/or external (2) grooves, each of the multitude of barriers comprising a first closing leg (10, 12) of a first profile part and a second closing leg (11, 13) of a second adjacent profile part, the second closing leg (11, 13) being directed to the first closing leg (10, 12), the first (10, 12) and second (11, 13) closing legs partially overlapping each other in longitudinal direction of the hose and having complementary shapes to form a substantially smooth inner and/or outer surface, characterized in that the profile comprises the following components:

a U-shaped part formed by a first (5) and second (6) upright leg separated by a first laying leg (8), provided to form an external protrusion (1) of the hose a second laying leg (9) that extends from the second upright leg (6) in a direction substantially parallel to the first laying leg (8) and opposite thereof, provided to form a part of the inner wall of the hose, said first (10,12) and second (11,13) internal and/or external closing legs situated at opposite ends of the second (9) and/or first (8) laying leg in opposite directions of each other, the first (10,12) and second (11,13) internal and/or external closing legs having a complementary shape.

8. A profile according to claim 7, characterized in that the profile further comprises a third upright leg (7) that extends from the connection between the first closing leg (10) and the second laying leg (9) in a direction substantially parallel to the first upright leg (5) so that an S-shaped profile is formed.

9. A profile according to claim 7, characterized in that the profile further comprises a third laying leg (14) that extends from the first upright leg (5) in a direction substantially parallel to the first laying leg (8).

10. A method for the production of the flexible hose comprising a corrugated wall of which an outer surface comprises a multitude of consecutive protrusions (1) and grooves (2) and of which an inner surface comprises the multitude of internal protrusions (4) and grooves (3), wherein said each internal protrusion (4) and groove (3) is respectively situated beneath a corresponding external groove (2) and protrusion (1) of the outer surface, characterized in that the corrugated wall comprises the multitude of barriers for closing off each of the multitude of internal (3) and/or external (2) grooves, each of the multitude of barriers comprising the first closing leg (10, 12) of the first profile part and the second closing leg (11, 13) of a second adjacent profile part, the second closing leg (11, 13) being directed to the first closing leg (10, 12), the first (10, 12) and second (11, 13) closing legs partially overlapping each other in longitudinal direction of the hose and having a complementary shape provided to form the substantially smooth inner and/or outer surface, the flexible hose being produced by spirally winding a profile according to claim 8, characterized in that the winding occurs in such a manner that the leg of the first profile part overlaps at least partly with a part of the leg of a consecutive second profile part, the overlapping parts of the legs being connected to each other.

11. A method for the production of a flexible hose according to claim 10, characterized in that the winding occurs in such a manner that the leg of the first profile part is a first laying leg (14) and the leg of the consecutive second profile part is a second laying leg (9) that partially overlap each other and wherein the overlapping part of the laying legs is connected to each other.

12. A method for the production of a flexible hose according to claim 10, characterized in that the winding occurs in such a manner that the leg of the first profile part is a first upright leg (7) and the leg of the consecutive second profile part is a second upright leg (5) that partially overlap each other and wherein the overlapping part of the upright legs is connected to each other.

13. A method for the production of the flexible hose according to claim 10, characterized in that the method comprises the following steps: production of a synthetic hose (22) with a circular section, heating of the hose to a predetermined temperature at which synthetic material of the synthetic hose is deformable without the synthetic material melting, deformation of the hose by compression in a mould between complementary mould parts (20, 21) so that the hose takes on a deformed shape and cooling of the hose so that the hose keeps the deformed shape after removal out of the mould.

14. A method according to claim 13, characterized in that the deformed shape has a non-circular section.

15. A method according to claim 13, characterized in that the heating of the hose occurs before the compression in the mould.

16. A method according to claim 13, characterized in that the heating of the hose occurs during the compression in the mould.

17. A method according to claim 13, characterized in that the heating of the hose is accomplished by blowing a heated gas through the hose.

18. A method according to claim 13, characterized in that the heating of the hose is accomplished by heating the mould parts.

19. A method according to claim 13, characterized in that the heating of the hose is accomplished by carrying out the compression in a heated room.

* * * * *